April 27, 1965    T. G. ROACH ETAL    3,181,105
CABLE CONNECTOR
Filed June 17, 1963

Thomas G. Roach
Melvin L. Denney
INVENTORS

United States Patent Office 3,181,105
Patented Apr. 27, 1965

3,181,105
CABLE CONNECTOR
Thomas G. Roach and Melvin L. Denney, both of
3343 S. Rice Ave., Houston, Tex.
Filed June 17, 1963, Ser. No. 288,150
2 Claims. (Cl. 339—94)

This invention relates to a new and useful cable connector which is easily assembled and disassembled and is useful in severe environmental conditions.

It is often necessary to connect electrical cable ends together for various reasons. As an example, a cable of a desired length may not be available, but it may be made by splicing two shorter lengths of cable together. Spliced joints in cables have heretofore exhibited certain mechanical and electrical weaknesses.

Connectors commonly used for splicing cable ends together tend to concentrate stress at some point where the outer sheath of insulation is cut or removed as a step in forming a spliced joint. Since the outer sheath of insulation provides mechanical strength which normally withstands any tension in the cable, the concentration of stress in the conductors weakens the over-all joint. Further, the stress may concentrate at a point where the terminal is soldered to the conductor which causes the solder connection to break. It a cable undergoes flexures, the bending may be concentrated at the solder joint or in the conductor where the insulation sheath is removed. Therefore, if a cable is under tension, the splice joint should be protected by concentrating the tension in the connector and not in the conductors, terminals, or solder joints.

One quality of an electrical cable is the resistance existing between a conductor and the surrounding shield or another conductor contained in the cable. A cable having a high leakage resistance is generally considered more desirable than one with one with a low leakage resistance. The leakage resistance of an electrical cable may be varied if the environmental conditions are altered. As an example, if a splice joint is left underwater a period of time, the water may leak through the juncture formed at the rear of the splice where the cable enters the connector. Salt water, which is more active chemically than fresh water, is particularly hard on spliced cables. Some connectors cannot be exposed to salt water because the salt water has an undesirable corrosive effect on certain materials. Further, such problems are compounded if a spliced cable joint is placed in deep salt water where the high pressure accelerates leakage into the spliced joint.

Connectors made in the past have overcome these difficulties by molding the connectors on the ends of the cables as integral portions of the insulating sheath surrounding the cables. The integral connectors are chemically bonded to the insulation sheath by a process which is sufficiently complicated to be performed only at factory locations. Thus, when a cable connecting an offshore well drilling platform to the electrical system located on land breaks, the cable must be sent to some factory location for repairs where connectors are bonded on the broken ends of the cable. This invention is a new and improved connector which may be attached to a cable without using a process requiring shipment of the cable to the factory location.

An object of this invention is to provide a new and improved cable connector which may be easily assembled or disassembled on location.

A further object of this invention is to provide a new and improved cable connector which maintains a high leakage resistance indefinitely under severe environmental conditions.

An important object of this invention is to provide a new and improved cable connector which removes cable tension from the terminals, solder joints, and individual conductors to prevent damage thereto under severe environmental conditions.

Still a further object of this invention is to provide a new and improved cable connector having a variable number of terminals of various sizes.

An important object of this invention is to provide a new and improved cable connector having components easily assembled and disassembled with a minimum of tools and effort.

Another object of this invention is to provide a new and improved cable connector which may be used to connect cables for use in sea water or other hydrostatic environments having pressures up to 20,000 pounds per square inch.

Another object of this invention is to provide a new and improved cable connector which is reusable and can be installed and removed repeatedly.

Other objects and advantages of the present invention will become more apparent from a consideration of the following description and drawings wherein.

Figure 1:
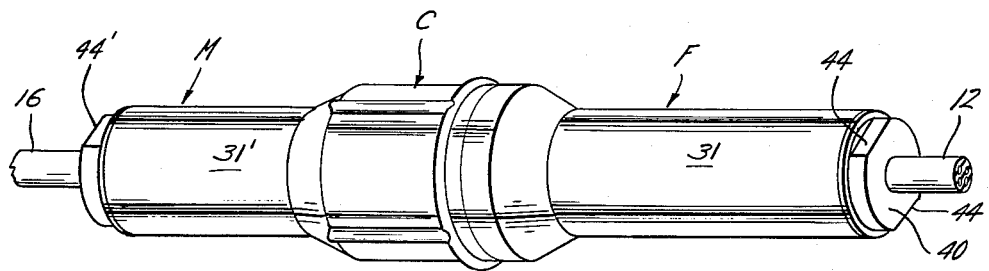
FIG. 1 is an assembled view showing the preferred form of the connector of this invention.

In accordance with the invention, a cable connector is provided to enable electric cables to be connected so as to withstand pressures up to 20,000 pounds per square inch. The essence of the invention resides in the use of a resilient spider having slots for receiving cable conductors which then returns to its original configuration to thereby reduce or eliminate voids in the connector. In the drawings, the letter F designates a female connector, and the letter M designates a male connector. A coupling sleeve C is provided for engagement with a set of threads T or other suitable coacting means for securing the connectors F and M in a fixed relationship. A set of pin terminals P of predetermined current handling sizes are secured to the individual conductors 11 contained in a cable 12 by solder joints or other suitable means. A set of socket terminals S mates with the pin terminals P and is connected to individual conductors 15 in a cable 16 by solder joints or other suitable means. The connection of the pins P with the sockets S forms electrically sound connections which are also mechanically sound due to the construction of the connectors F and M. The connectors F and M are pulled together and secured in a watertight relationship when the sleeve C threadedly engages the threads T.

Figure 2:
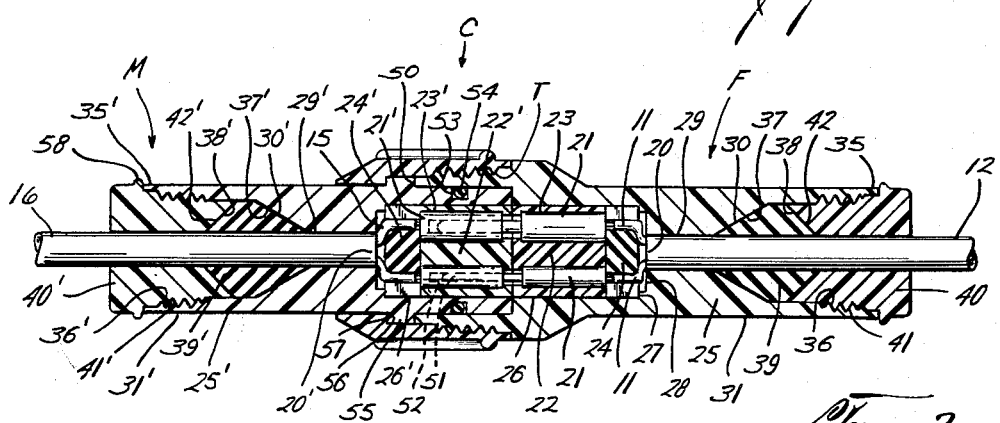
FIG. 2 is a sectional view of the assembled connector of the invention.

Considering the invention more in detail, FIG. 2 discloses a cable 12 with its insulation stripped therefrom at 20 exposing individually covered conductors at 11 which are connected to rearward connective means 21 of the pins P. The connections are performed in some conventional manner and form no part of the invention herein disclosed. The pins P are placed in a terminal support member 22 having chambers 23 sized to snugly receive said pins therein. Those skilled in the art may locate the chambers 23 relative to the cross-section of the support member 22 with consideration given to the number of the chambers 23, the diameter of the pins P, and the voltage existing between adjacent pins P.

The conductors 11 are illustrated as passing through a cushioning member or spider 24 which is cylindrical in shape and has holes extending therethrough. The conductors 11 are installed in the holes by pressing them against the slits 24a provided in the spider 24 for that purpose. When the conductors 11 are received in the slots 24a, the spider 24 returns to its original configuration to thereby reduce or eliminate air voids in the cable connector. The spider 24 prevents the conductors 11 from flexing at or near the solder joint and further aids in positioning the support member 22. Preferably, the spider 24 is made of a resilient material to cushion the conductors 11 which tend to move longitudinally when the connector is subjected to high environmental pressures.

The terminal support member 22 and the spider 24 are snugly placed in a housing 25 which has a chamber 26 for receiving said elements. The elements are longitudinally displaced of the chamber 26 to abut against a shoulder 27 which is so located that the faces of both the housing 25 and support member 22 are essentially positioned in the same laterally extending plane to generally form a body supporting the terminals. The shoulder 27 extends radially inward of the housing 25 to form an opening 28 which extends longitudinally from the chamber 26. The opening 28 provides an adequate unoccupied volume of space for containing the conductors 11 as they emerge from the severed sheath 20 of the cable 12. The opening 28 communicates with an axially centered passage 29 which provides egress for the cable 12 which is passed therethrough. The cable 12 emerges from the passage 29 centrally of an angularly extending surface internally of the housing 25, said surface forming a seating surface and generally designated by the numeral 30. The purpose of the seating surface 30 will be adequately explained hereinafter.

The housing 25 has a smooth external surface 31 which terminates said housing in a lip or flange 35. The flange 35 extends axially about the cable 12 to form a shallow opening in the housing 25 adjacent the seating surface 30. The flange 35 has threads 36 deployed in the shallow opening beyond the furthest extent of the seating surface 30. A rubber mass circumferentially surrounds the cable 12 and has associated therewith a forward sealing surface 37 and a rear sealing surface 38, each extending fully about the rubber mass which functions as a seal to prevent leakage and cable tension within the connector and is identified with the numeral 39. The seal 39 is held in the illustrated position of FIG. 2 by a seal locking means 40 which has threads 41 on its outer cylindrical surface for coacting with the threads 36 of the housing 25. The seal lock 40 has a seating surface 42 for mating with the rear sealing surface 38 of the seal 39 upon threaded engagement with said housing. A set of wrench flats 44 is provided on the seal lock 40 for convenience of electricians or other craftsmen.

Because both male M and female F connectors are similar in several respects, the above disclosure applies equally to both, and repetition thereof is considered unnecessary. However, the elements of the male connector M and the female connector F may be distinguished by the primed numbers used with the male connector M in the drawings. The differences between the male M and female F connectors are set forth hereinafter. The pins P and sockets S are not limited to the illustrated placements, but rather, may be placed in either housing 25 or 25'.

The female connector F is equipped with a flange 50 which extends axially beyond the housing 25 to encircle the forward connective elements 51 of the pins P to protect the pins P from damage when the connectors M and F are not mated. The flange 50 is adapted to enclose the forward end of the housing 25' of the male connector M as a means of bringing the forward connective means or receptacles 52 of the sockets S into electrical connection with the forward connective means 51 of the pins P. Upon completion of such electrical connection, current will readily flow through a given conductor 11 of the cable 12 and into a chosen conductor 15 of the cable 16.

The housing 25' has an annular groove 53 extending circumferentially thereof for receiving and securing a coupling seal means such as the rubber O-ring 54 to form a leak proof connection between the male M and female F connectors. Those skilled in the art may deviate from the preferred location disclosed herein, and as an example, locate sealing means interiorly of the coupling C. Located parallel to the groove 53 and rearwardly positioned therefrom is an annular rib 55 having a shoulder 56 arranged in an abutting position relative to a mating shoulder 57 of the coupling C. The rib 55 limits forward motion of the coupling C as does a small lip 58 of the seal lock 40 limit the rearward motion of the coupling C.

The male connector M is assembled in the following manner. The seal lock 40' is threaded with the cable 16 and seal means 39' is next placed on the cable. The coupling C is likewise threaded and is followed with the housing 25'. The sheath is cut at 20', and the conductors 15 are placed in the spider 24'. The conductors 15 are stripped of insulation and are soldered to the sockets S which are enclosed in the support member 22'. The seal lock 40' is threadedly engaged with the housing 25', and that forms a leak proof seal at the juncture of the housing 25 and the cable 16, for the sealing surfaces 37' and 38' mate with the seating surfaces 30' and 42' to squeeze the pliable seal means against the cable to prevent pulling and leakage along the cable 16. The squeeze exerted on the sealing surfaces 37' and 38' of the seal means 39' forces it to clamp the cable 16 tightly in a manner which prevents tension in the cable 16 from being experienced by the solder joints of the conductors 15. The clamping action is highly desirable, for the solder joints securing the individual conductors 15 to the sockets S are easily sheared by tension. Of course, the seal means 39 of the female connector F clamps the cable 12 in a similar manner upon assembly resulting in shear protected solder joints.

Figure 3:
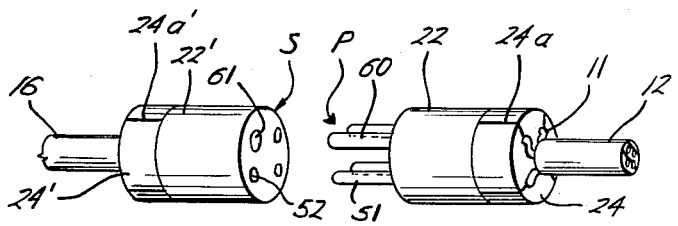
FIG. 3 is a view showing further detail related to the electrical terminals of this invention.

In using the connectors of this invention, either connector may be installed on the end of cable in a few minutes using commonly available tools. When a particular male connector is wired so that its sockets S coincide with the pins P of a female connector F, means should be provided to prevent improper mating of terminals of the opposite sex. The terminals are often located at points equidistant from one another in a circular arrangement and mating connectors rotated relative to one another by various amounts may be interconnected whereby each pin P may communicate with each socket S. FIG. 3 discloses the preferred embodiment of means preventing undesired connections as comprised of an oversized pin 60 and appropriate socket 61. Alternatively, a rib on one connector and recess on the other connector may be adapted to engage one another as means preventing improper electrical connections.

The preferred embodiment may be practiced by those skilled in the art with alterations incorporated therein. The outer surfaces 31 and 31' may be knurled for easier gripping, and the coupling C may be equipped with wrench flats. The housings 25 and 25' are not limited to circular cross-sections, but may be formed in any desirable geometric configuration; a non-circular housing would necessitate use of different means of securing the coupling C to the housing 25. A flange added to the housing 25 in a plane perpendicular to the axis of said housing would provide attaching means for use in securing a connector to a bulkhead. The flange might be drilled with mounting holes and even be equipped with seal means for maintaining a leak proof bulkhead.

The invention is preferably made from a material not affected by salt water to allow oceanic usage. Some rigid plastics, such as one commonly designated "Kralastic" or metals such as stainless steel, may be used to manufacture all parts except the spider 24, seal means 39, O-ring 54, and the support 22.

Briefly, this invention relates to an easily assembled cable connector which protects connections made therein from leakage and from cable tension which causes short circuits and pulls solder joints apart, respectively.

What is claimed is:

1. A connector attachable between a pair of cable ends having a plurality of conductors therein whereby the conductors may be releasably connected to form a plurality of conducting paths comprising:

(a) a pair of body means, each of said body means having a passage therein for receiving a cable end therethrough;

(b) each of said body means having a longitudinally extending chamber therein;

(c) a terminal support member fitting snugly in each of said chambers;

(d) a plurality of terminal receiving chambers in each of said terminal support members, said terminal receiving chambers in one terminal support member aligning axially with terminal receiving chambers in said other terminal support member;

(e) electrical sockets placed in said terminal receiving chambers in one said terminal support member;

(f) electrical pins placed in said terminal receiving chambers in said other terminal support member;

(g) the plurality of cable conductors extending from the cable ends;

(h) the cable conductors from one of the cable ends being connected to said electrical pins and the conductors in the other cable end being connected to said electrical sockets;

(i) a resilient spider positioned in each of said longitudinally extending chambers in each of said body means abutting said terminal support members;

(j) slots formed in said spiders for receiving the cable conductors through said spiders, said resilient spiders closing about the cable conductors to fill the voids in said chambers and position the cable conductors for connection to said electrical pins and electrical sockets;

(k) each of said resilient spiders filling voids in said chambers and abutting the cable conductors against said body means for locking the cable ends against longitudinal movement into said body means under pressure and for retaining the cable conductors in a fixed position in said spider slots against longitudinal movement into said chambers;

(l) a seating surface formed on each of said bodies circumferentially about the rear openings of said passages;

(m) seal means surrounding the cable with a pliable mass adapted to sealingly contact against each of said seating surfaces;

(n) seal lock means for releasable attachment to each of said body means for urging said seal means into conforming contact with said seating surfaces to form a leak proof seal between said body means and cables;

(o) coupling means formed on one of said body means; and (p) coacting means carried on the other of said body means for engaging said coupling means and drawing said body means together to form a tension relieving and leak proof connection when said pins and sockets are joined together.

2. A connector attachable between a pair of cable ends having a like plurality of conductors extending from each cable end to form releasable connections in a plurality of conducting paths comprising:

(a) a pair of body means, one for each cable end;

(b) each of said body means including a plurality of terminal receiving chambers aligning axially with terminal receiving chambers of the other of said body means;

(c) each of said body means including passage means emerging from said body means at an opening and extending therethrough to said terminal receiving chambers;

(d) electrical sockets placed in said terminal receiving chambers in one said body means;

(e) electrical pins placed in said terminal receiving chambers in the other said body means, (f) the conductors from one of the cable ends being connected to said electrical pins and the conductors from the other cable end being connected to said electrical sockets with the cables extending through said passage means in said body means;

(g) resilient means positioned in both of said body means in said passage means;

(h) releasable openable slots formed in said resilient means and extending longitudinally of said resilient means for receiving, surrounding, and retaining the cable conductors extending from the cable ends to said electrical sockets and pins;

(i) said resilient means, after receiving the cable conductors therethrough, returning to its original configuration for filling voids in said passage means;

(j) said resilient means filling voids in said body means and abutting the cable ends and the cable conductors for locking the cable ends against longitudinal movement into said body means under pressure and for locking the cable conductors against longitudinal movement into said terminal receiving chambers;

(k) a seating surface formed on each of said body means circumferentially about the opening of said passage means;

(l) seal means surrounding the cable with a yieldable mass adapted to sealingly contact each of said seating surfaces;

(m) seal lock means for releasably urging said seal means into conforming contact with said seating surfaces;

(n) coupling means formed on one of said body means;

(o) coacting means for engaging said coupling means and drawing said body means together to form electrical connections between said electrical sockets and pins with said connections being free of cable tension and electrically insulated from one another.

References Cited by the Examiner
UNITED STATES PATENTS

| | | |
|---|---|---|
| 1,134,954 | 4/15 | Keough. |
| 2,209,814 | 7/40 | Finger. |
| 2,255,763 | 9/41 | Doughman. |
| 2,454,838 | 11/48 | Richardson et al. _____ 339—60 X |
| 2,703,870 | 3/55 | Minto _____ 339—89 X |
| 3,040,287 | 6/62 | Arron et al. _____ 339—94 |

DONLEY J. STOCKING, Primary Examiner.

JOSEPH D. SEERS, W. DONALD MILLER, Examiners.